T. B. SULLIVAN.
APPARATUS FOR UTILIZING THE WASTE HEAT AND INCREASING THE CIRCULATION OF THE AIR DURING THE DRYING AND BURNING PROCESSES IN KILNS.
APPLICATION FILED DEC. 12, 1917.

1,284,943.

Patented Nov. 12, 1918.
2 SHEETS—SHEET 1.

INVENTOR.
Thomas B. Sullivan
BY
Rich H Manning
ATTORNEY.

T. B. SULLIVAN.
APPARATUS FOR UTILIZING THE WASTE HEAT AND INCREASING THE CIRCULATION OF THE AIR DURING THE DRYING AND BURNING PROCESSES IN KILNS.
APPLICATION FILED DEC. 12, 1917.
1,284,943.
Patented Nov. 12, 1918.
2 SHEETS—SHEET 2.
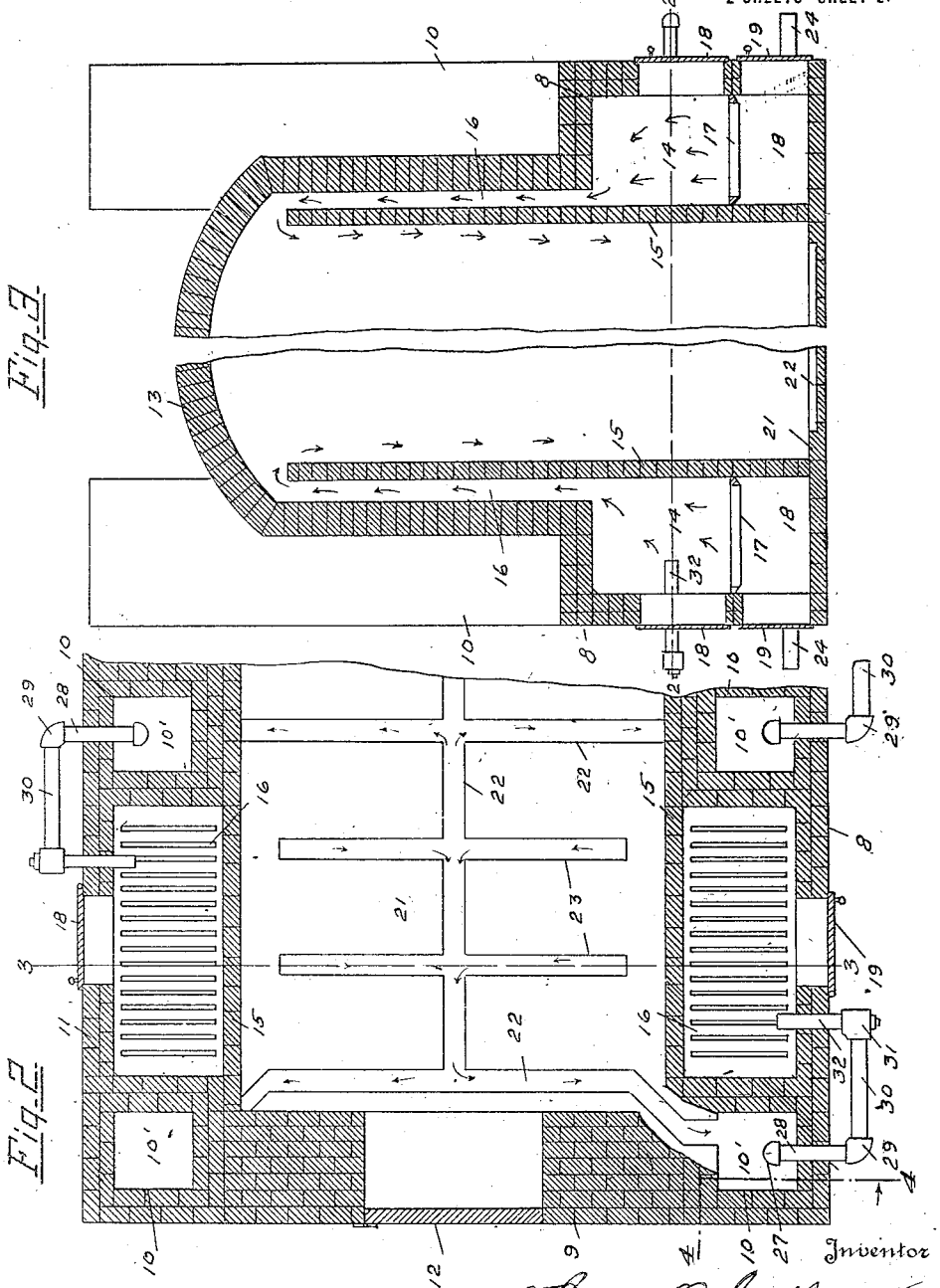

UNITED STATES PATENT OFFICE.

THOMAS B. SULLIVAN, OF KANSAS CITY, MISSOURI.

APPARATUS FOR UTILIZING THE WASTE HEAT AND INCREASING THE CIRCULATION OF THE AIR DURING THE DRYING AND BURNING PROCESSES IN KILNS.

1,284,943.           Specification of Letters Patent.    Patented Nov. 12, 1918.

Application filed December 12, 1917. Serial No. 206,819.

*To all whom it may concern:*

Be it known that I, THOMAS B. SULLIVAN, a citizen of the United States of America, residing at Kansas City, in the county of Jackson and State of Missouri, have invented a certain new and Improved Apparatus for Utilizing the Waste Heat and Increasing the Circulation of the Air During the Drying and Burning Processes in Kilns, of which the following is a specification.

During the burning process of potters' ware and brick in the ordinary kiln, the heat after circulating through the ware stacked within the chambers of the kiln, seeks the nearest outlet through one of the waste heat conductors or smoke stacks, which extend upwardly from the interior of the ordinary kiln. The supply of air to aid combustion of the fuel on the furnace grates is through the door opening, the door in practice being kept partially open, so as not to overburn the ware in the immediate vicinity of the furnace, and to drive the heat out of the furnace into the kiln, the old method in practice causing a great waste of fuel.

The burning of the ware under these high temperatures results:

First: In the expenditure of an unnecessary amount of fuel to burn the ware, and Second: In an over-burning of the ware in the immediate vicinity of these high temperatures, which destroys the value of the ware.

Figure 1:
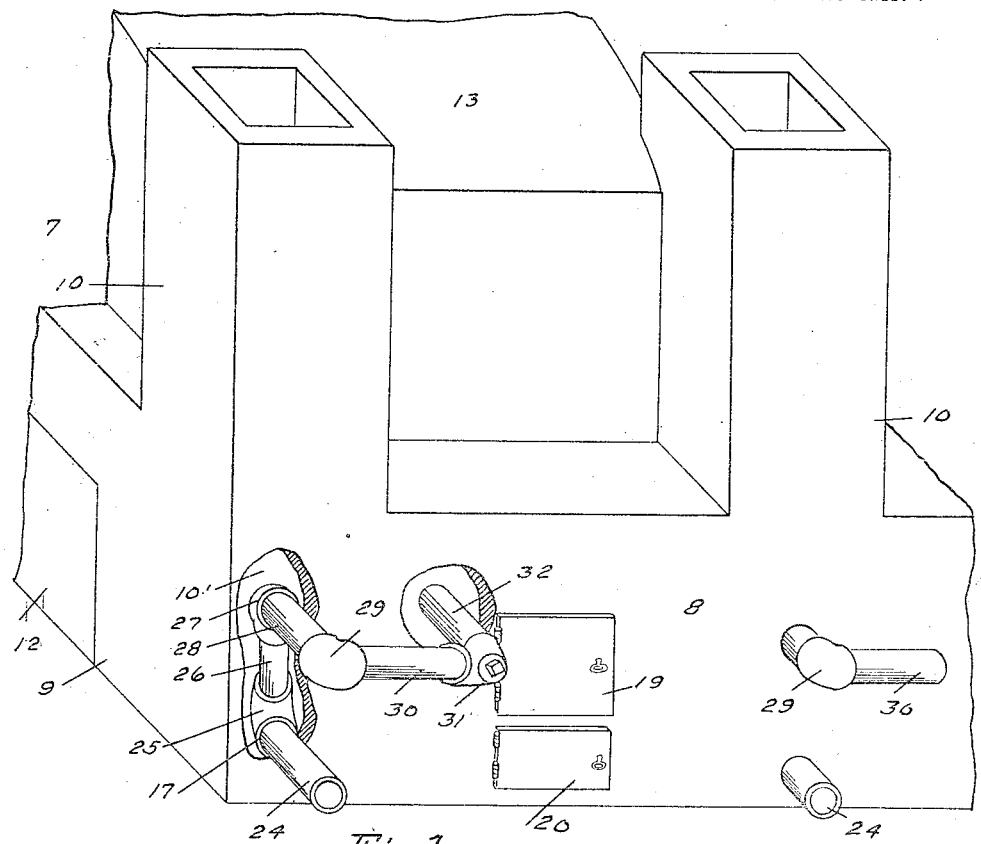

The method and apparatus whereby an automatic regulation of the temperatures in the kiln is obtained, with an improved circulation of the heated air and an equal burning of the ware, will now be first fully described, and then specifically pointed out in the claim, reference being had to the accompanying drawings, forming a part of this specification, in which;

Figure 1. is an orthographic view of a brick kiln, showing the waste heat conductors or stacks, for the escape of the heat following the burning of the ware, the door to the furnace being closed, and portions of the wall leading to the furnace and into the stack, broken away, showing the air heater in the stack, and the conductor leading thereto, and from the heater to the furnace.

Fig. 2. is a horizontal view, taken through the kiln, on the line 2, 2, in Fig. 3, showing the furnace and furnace grates, and the waste heat conduits in the floor of the kiln, leading to the stacks; also showing the heaters installed in the stacks, and the conductors for regulating the heat in the kiln, leading out of the stacks, and thence to the furnaces.

Fig. 3. is a vertical, sectional view, taken through the kiln, on the line 3, 3, in Fig. 2, showing the baffle walls and passages for the heated air and products of combustion on the furnace grates, for burning the ware, showing the ash pits, and the waste heat laterals in the floor of the kiln.

Figure 4:
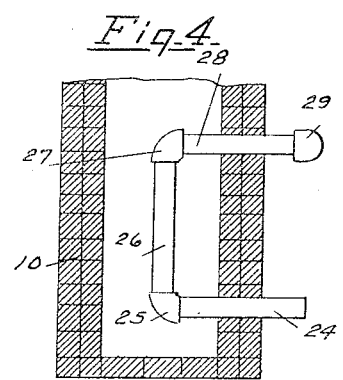

Fig. 4. is a vertical, sectional view, taken through the lower portion of one of the stacks, taken on the line 4, 4, in Fig. 2, showing the air heater within the stack.

Figure 5:
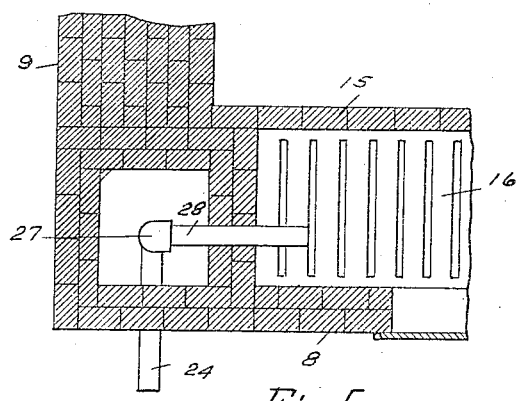

Fig. 5. is a horizontal, sectional view, taken through one of the smoke stacks, and a portion of the furnace wall, showing the conductor of heated air leading directly from the heater into the furnaces.

7 in the drawings, to which reference is made, indicates a brick kiln, of the ordinary construction, in which 8 indicates the front wall, 9, 9 the side walls, and 10 the smoke stacks for the waste heat conductors. 11 indicates the rear end wall, and 12 the door leading within the kiln. 13 indicates the dome or roof of the kiln. 14 indicates the furnaces, as shown, within the respective front and rear walls 8 and 11, the furnaces occupying the space between the smoke stacks 10, 10, the inner walls 15 to the furnaces extending upwardly, as seen in Fig. 3, nearly to the dome or roof 13, and between which wall and the outer wall of the kiln are the passages 16, for the smoke and heated air from the furnaces, which pass over the wall to the inner chamber of the kiln. 17 indicates the furnace grates, and 18 the ash pits beneath the grates. 19 indicates the doors to the furnaces, and 20 the door openings leading to the ash pits.

21 indicates the floor of the kiln, and 22 the open conduits for the waste heat in the floor of the kiln, leading to the stacks 10; and 23 are the lateral waste heat conduits connected with the conduits 22.

24 indicates a cold air pipe, which, for the purposes of the invention, is extended inwardly through the side wall of one of the stacks 10, into its waste heat conductor 10', below a line horizontal with the furnace grate 17, and is connected by the elbow 25, with the lower end of a short length of pipe 26, constituting a receiver for cold air, and also a heater, which pipe extends upwardly a short distance within the waste heat conductor 10', and upon its upper end is an elbow 27, and with said elbow is connected the inner end of a pipe 28, the outer end of which pipe extends outwardly through a wall of the stack 10, above the cold air pipe 24, and is provided with an elbow 29. With the elbow 29 is connected one end of a pipe 30, which pipe extends horizontally and parallel with the outer surface of the wall 8, of the kiln, to a point adjacent the door 18, leading to the furnace, and is provided with a three-way pipe joint 31, with which joint is connected the outer end of a pipe 32, the inner end of which pipe being extended through the wall 8, into the furnace above the furnace grate 15.

The ware to be burned, which has previously been dried by waste heat in the ordinary manner, is stacked on the floor 21 of the kiln, the ware, such as brick, being laid crosswise to the conduits 22 and the laterals 23, and spaced apart so that the heated air will circulate through the stacks. The doors 19, leading to the furnace are then closed and the products of combustion from the fuel pass up the passages 16, thence over the inner furnace wall 15, through the ware and through the waste heat conduits 22 and 23 to the waste heat conductors of the stacks 10. During the combustion of the fuel on the furnace grates, the circulation of the heated air through the ware, which is primarily from that passing through the furnace grate, increases in intensity, and the waste heat which passes through the waste heat conductors to the stacks, circulates around the pipe or heater 26, which becomes heated to a high degree of temperature, and the air within the pipes becomes rarefied, causing an inflow of cold air through pipe 24, which, becoming heated, passes through the pipes 28, 30 and 32, into the furnace above the fuel on the grates, and, commingling with the products of combustion, accelerates the circulation through the ware, and equalizing the heat in the kiln. As the temperature rises in the kiln from the supply of fuel to the furnace grates, the cold air is drawn from outside the kiln, to become heated, and forms the circulating and expediting medium for the products of combustion through the ware, and as the fire decreases in intensity, the increasing cold air through pipe 24 decreases, hence an automatic regulation of the heat is produced in the kiln, and at the same time the combustion of the fuel is such as to economize the fuel, in proportion to the amount required for burning a determinate amount of ware, without over-burning. The heater or pipe 26 is made short in length, for the reason that a short pipe will not burn out as quickly as a long pipe, and when the heater is once placed within the waste heat conductors a renewal is made with difficulty and at considerable expense.

The cold air inlet, to obtain the results automatically, must be below the horizontal line of the furnace grates, as the air when heated becomes, with the door of the furnace closed, the medium of regulation for the combustion of the fuel.

I am aware that air conduits have been arranged within a smoke pipe and extending across the same in which the whole pipe or conduit is subject to the heat of the unconsumed gases from the products of combustion.

In a smoke stack to a kiln a device of this kind would simply be an outlet for the heated gases from the volume of the air and gases within the furnace.

The employment of steam and air blasts to force the air heated by furnace temperatures to aid the products of combustion are well known. None of these methods effect an automatic regulation of the cold air to the furnace, hence in a smoke stack to a kiln the air must ascend from a low plane to a higher.

In the kiln the natural draft of the heated air in the furnace being toward the stacks, the heated air in my device passes through the cooler pipes 28 and 30 by the induction of the air which passes through these pipes and which acts to produce automatic action upon the heated air subjected to a high temperature in the heating pipe 26 and consequently as the fire upon the furnace grate increases or decreases in violence the air passes through the pipes 28 and 30 without back pressure, but with a corresponding regulation.

The furnaces at both ends of the kiln are regulated simultaneously, and in the manner described.

A more direct passage of the heated air from the heater may be through the stack, directly into the furnace, as seen in Fig. 5, in which the pipe 28 is made to serve the purposes of pipes 30 and 32. In the method employed in Fig. 1, for conducting the heated air outside the stack, then to the furnace, insures less danger from leakage of waste gases around the pipe, which, subjected to expansion and contraction, might form openings in the stack, it being, however, the embodiment of the method used to heat the cold air, thus rarefying it, and increasing combustion of the fuel, and the circulation of the heated air within the burning chamber of the kiln.

Having fully described my invention, what I now claim as new, and desire to secure by Letters Patent is:

In a kiln, the combination with a closed furnace having closed doors, and furnace grate and smoke stack, and with the burning chamber having conduits for the waste heated gases leading to the smoke stack, of an automatic air heating and conducting vertical pipe within the lower portion and near the base of the smoke stack adjacent said conduits, a cold air inlet pipe leading within the smoke stack below a horizontal line with the furnace grate and connected with the lower end of the air heating pipe, and a conducting pipe for the heated air connected at one end with the upper end of the air heating pipe and having the other end extending outwardly through the smoke stack, thence within the furnace in proximity to the products of combustion on the furnace grate.

THOMAS B. SULLIVAN.

Witnesses:
 GEO. A. ANDERSON,
 ANNIE L. GREER.